United States Patent [19]
Bingham et al.

[11] Patent Number: 5,289,589
[45] Date of Patent: Feb. 22, 1994

[54] AUTOMATED STORAGE LIBRARY HAVING REDUNDANT SCSI BUS SYSTEM

[75] Inventors: Robert L. Bingham; Kamal E. Dimitri, both of Tucson, Ariz.

[73] Assignee: International Business Machines Corporation, Armonk, N.Y.

[21] Appl. No.: 579,505

[22] Filed: Sep. 10, 1990

[51] Int. Cl.$^5$ .............................................. G06F 13/40
[52] U.S. Cl. ................................... 395/425; 395/575; 395/325; 364/240; 364/240.5; 364/248.1; 364/DIG. 1
[58] Field of Search ............... 395/275, 800, 325, 425, 395/575; 369/291; 358/86; 364/423

[56] References Cited

U.S. PATENT DOCUMENTS

| | | | |
|---|---|---|---|
| 4,015,246 | 3/1977 | Hopkins et al. | 340/172.5 |
| 4,228,496 | 10/1980 | Katzman et al. | 395/200 |
| 4,245,344 | 1/1981 | Richter | 371/68 |
| 4,342,112 | 7/1982 | Stodola | 371/68 |
| 4,365,295 | 12/1982 | Katzman et al. | 395/425 |
| 4,368,523 | 1/1983 | Kawate | 365/63 |
| 4,412,281 | 10/1983 | Works | 395/575 |
| 4,627,045 | 12/1986 | Olson et al. | 370/16 |
| 4,627,070 | 12/1986 | Champlin et al. | 375/3 |
| 4,630,265 | 12/1986 | Sexton | 370/85 |
| 4,634,110 | 1/1987 | Julich et al. | 371/11 |
| 4,654,846 | 3/1987 | Goodwin et al. | 371/8 |
| 4,695,952 | 9/1987 | Howland | 395/325 |
| 4,747,115 | 5/1988 | Nambu | 375/100 |
| 4,750,177 | 6/1988 | Hendrie et al. | 371/32 |
| 4,792,950 | 12/1988 | Volk et al. | 371/8 |
| 4,821,170 | 10/1989 | Bernick et al. | 395/275 |
| 4,875,037 | 10/1989 | Escolar | 340/825.01 |

FOREIGN PATENT DOCUMENTS

| | | |
|---|---|---|
| 0212425 | 8/1986 | European Pat. Off. . |
| 0280263 | 2/1988 | European Pat. Off. . |
| 0341037 | 5/1989 | European Pat. Off. . |
| 0357464 | 9/1989 | European Pat. Off. . |
| 3843218A1 | 12/1988 | Fed. Rep. of Germany . |

OTHER PUBLICATIONS

Narayan, Ajit, "A 30 Terra Byte Mass Storage Architecture", *Digest of Papers 9th IEEE Symp. on Mass Storage Systems*, pp. 103–107.

Einberger, John W., "CD-ROM As a Mass Storage Device" Digest of Papers Ninth IEEE Symposium on Mass Storage 1988, pp. 125–129.

Halet et al., "Present Status of Optical Storage Professional Market Applications" IEEE Reprint CH2704-5/84/0000/1060 1989, IEEE.

K. E. Beilstein, Jr., "Dynamically Configured Redundant Bus Structure," Jul., 1986, IBM Tech. Discl. Bulletin, vol. 29, No. 2, pp. 742–743.

C. W. Ellis, et al., "Cross Connected Busses In A Dual-Microprocessor Environment," Dec., 1987, IBM Tech. Discl. Bulletin, vol. 30, No. 7, pp. 136–137.

*Primary Examiner*—Thomas C. Lee
*Assistant Examiner*—Paul R. Lintz
*Attorney, Agent, or Firm*—M. W. Schecter

[57] ABSTRACT

An optical disk library having a redundant SCSI bus system which utilizes double-sided, multi-ported switches for connecting each of two library controllers to all library pickers and some or all of the optical disk drives in the library is disclosed. The use of additional library controllers and pickers allows for greater subsystem flexibility and redundancy. The switches minimize the need for additional SCSI adapters to the library controllers and include anti-latch circuitry between sets of transceivers to eliminate the need to know the direction of data flow on a bus. In addition, the switches are physically located apart from the SCSI adapters, pickers, and optical disk drives, thereby minimizing the amount of customization required, and permit switching from the primary library controller to the secondary library controller to provide access to any optical disk in the library when a failure in the system has otherwise made such optical disk inaccessible through the primary library controller. The pickers and optical disk drives are coupled to the switches in one or more singleended strings to simplify library operations and minimize the amount of the library made inoperative by a device failure. Each picker is coupled to the switches on a single-ended string to which no optical disk drive is attached, further reducing the likelihood that access to optical disks in the library will be lost during a failure.

15 Claims, 4 Drawing Sheets

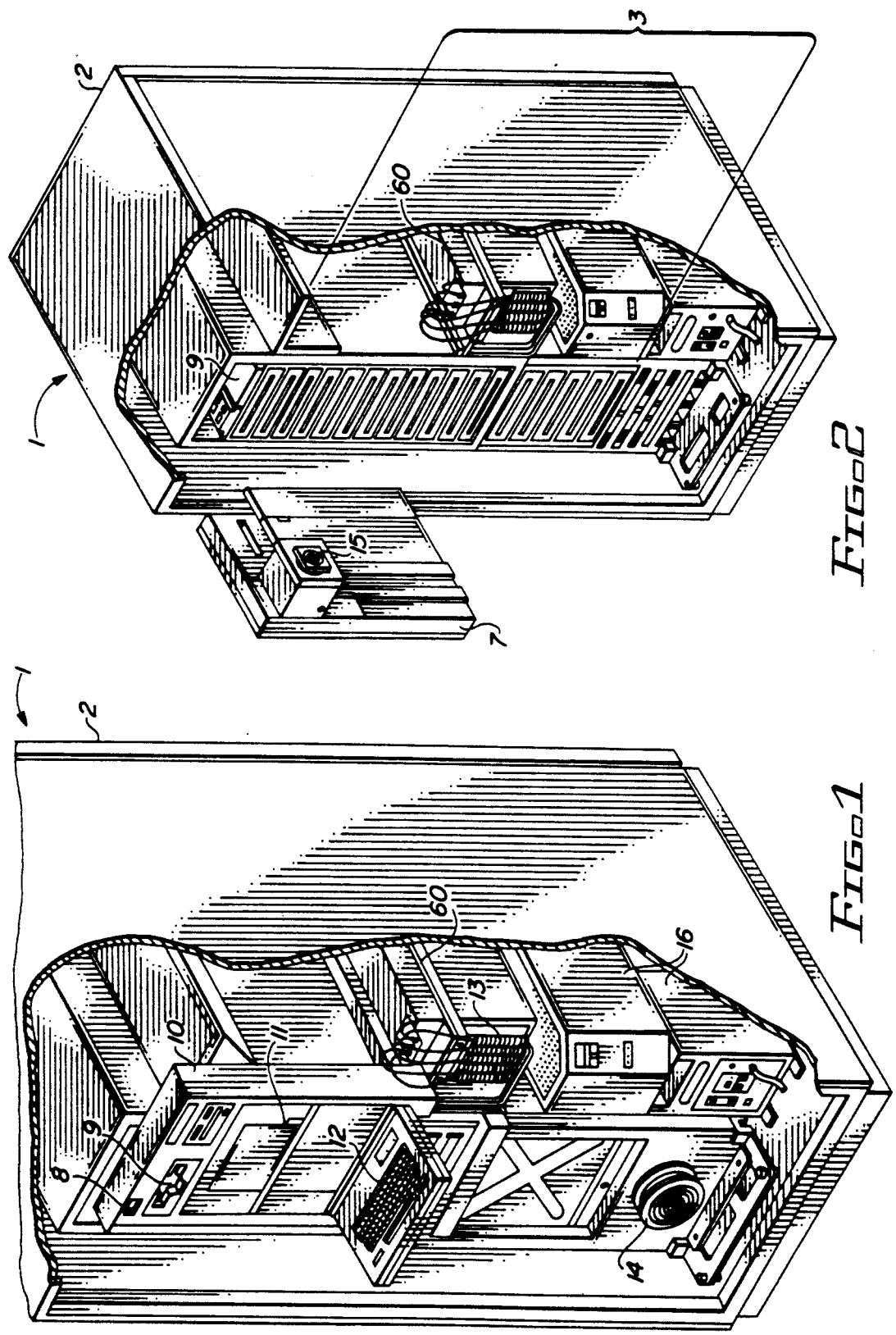

AUTOMATED STORAGE LIBRARY HAVING REDUNDANT SCSI BUS SYSTEM

BACKGROUND OF THE INVENTION

1. Field of the Invention

The present invention relates to an automated storage library having a redundant SCSI bus system. More particularly, the present invention is an automated storage library having a redundant SCSI bus system permitting switching among paths between library controllers, pickers, and peripheral storage devices should one path become disabled.

2. Description of the Related Art

The main components of a computer system include host processors, input/output (I/O) devices, and storage. Processors are the brain of computer systems, performing arithmetic and logical operations. I/O devices permit data to be input to or output from the system. A keyboard is an example of an input device and a printer is an example of an output device. Storage includes means for temporarily and permanently storing information, including user data and the instructions which direct computer operations. Storage may be within a processor, such as integrated circuit main memory, or may be peripheral thereto, such as magnetic disks, magnetic tapes, and optical disks. A machine used to write to and read from such peripheral storage is known as a peripheral storage device and typically includes a device controller for translating processor commands into the physical actions of the device itself. Each of the computer system components may be divided into subcomponents and may be distributed across various locations within the computer system.

The set of wires, paths, or connections for carrying signals throughout a computer system is known as a "bus". These internal pathways for information signals may also be subdivided. For example, a computer system may include a data bus, control bus and address bus. A particular set of communication signal protocols is typically used on a bus, depending upon such factors as the computer system components, the configuration of such components, and the bus pathing scheme. Many bus schemes are therefore customized to meet the needs of a particular computer system. The addition of a new type of peripheral storage device to the system thus also requires the addition of hardware and/or software to teach the processor how to communicate with such new device.

The development of inexpensive device controllers has recently changed the economics of small computer system storage devices. Where controller logic was once shared among many devices, it is now more economical to build a device controller in each storage device. As the number of types of storage devices for small computer systems has grown dramatically in recent years, so has the need for a common interface and bus scheme to simplify the attachment of new system components. As a result, the small computer system interface (SCSI) has become an industry standard. SCSI is a specification for a bidirectional, peripheral storage device bus and command set. The specification defines a high performance interface that distributes data among peripherals independently of a host processor. Generally, a SCSI bus provides a computer system with storage device independence within a class of devices, such as disk drives or tape drives. Different devices within a particular class can thus be added to a computer system without major modification of the system hardware or software. Adapter cards and SCSI protocol chips are used to connect processors to a SCSI bus scheme. Such chips and cards are available from numerous vendors to support SCSI bus schemes for common computer systems (e.g. IBM personal computers and machines compatible therewith). The chips and cards may be custom designed, but are much smaller and easier to design than a complete computer system, and may themselves be standardized as field replaceable units for particular systems.

It is known to make computer systems somewhat fault tolerant and more efficient through the use of redundancy in certain components, including multiple bus schemes. Multiple bus schemes are sometimes referred to as multiple buses, or as a single bus having multiple paths. Multiple paths between two system components allows for communication therebetween despite the failure or busy status of one of such paths. Some redundant bus schemes are designed to improve system operating speeds by dynamically switching between multiple paths during normal (i.e no failed components) system operations. Because of their dynamic nature, these bus schemes tend to be quite complex and are thus not practical in many applications. Other bus schemes are designed merely to maintain the availability of data despite certain component failures. Such redundant bus schemes typically rely on a primary bus to carry communications between any two particular components, and a secondary bus which can be switched into use should the primary bus fail. However, as previously mentioned, most bus schemes - redundant or not are custom designed for the particular computer system in which they are used and are thus not suitable for use in other computer systems. For example, redundant storage libraries (such as the combination of the IBM 3990 Storage Control Unit and the IBM 3380 Direct Access Storage Device) use either two oppositely flowing unidirectional buses, or a single bidirectional bus which is customized to accommodate such bidirectionality.

A redundant SCSI bus system is disclosed in U.S. Pat. No. 4,821,170. The patent discloses an I/O system for a plurality of host processors and a plurality of I/O devices in which ownership of the processor I/O channels is shared. The bus scheme includes two strings of SCSI peripheral devices which are connected at each end to either of two switches each embedded in and controlled by a different SCSI protocol chip, thereby forming a loop (i.e. the strings are double-ended). Each SCSI protocol chip is itself mounted on the adapter card of a different one of two device controllers. Because each switch is embedded in an adapter card, the adapter card itself is customized. The modification of the SCSI bus scheme to create redundancy thus results in some subcomponents no longer being SCSI standard, contrary to the original purpose of the SCSI bus scheme. Also, the adapter cards/switches are customized to accommodate the passage of information in addition to that otherwise passed to and from a switch in a SCSI bus scheme. For example, the switch control logic lines are connected directly to the adapter cards, thereby allowing the adapter cards to signal the switches active only for the precise transaction desired. The adapter card senses the completion of a transaction across a switch and can then deactivate such switch to prevent latching of the switch. Such a smart adapter card/switch allows for the bus scheme to perform certain tasks such as concurrent access to two devices (one per string), but at the expense of requiring customized parts.

Among the constraints of a SCSI bus is the attachment of no more than eight SCSI devices, including both processors and peripheral storage devices. Because of such constraint, a SCSI bus is not generally considered practical for use in large computer systems. Automated storage libraries, typically used only in large systems, are thus not designed with SCSI bus schemes. An automated storage library is a subsystem including one or more peripheral storage devices (i.e. a storage library), a set of storage cells for maintaining a library of peripheral data storage media, and a robotic picker capable of transferring such media therebetween upon command (i.e. to automate the storage library). Generally, the picker is capable of inserting a data storage medium into or removing a data storage medium from a storage cell or a peripheral storage device within the subsystem.

An automated storage library thus provides for a massive amount of data to be maintained accessible to a processor without manual assistance and is used most frequently in large computer systems because only those systems require such amounts of storage.

One automated storage library that does use a SCSI bus system is the IBM 9246 Optical Disk Library. Unfortunately, this library uses the SCSI bus inefficiently. The library includes two separate controllers, each attached only to a separate string of optical disk drives by different SCSI buses. No bus redundancy is achieved to the optical disk drives. A single picker is used to service both device strings. The single picker is not treated as a SCSI device and thus is not coupled to a SCSI bus. Instead, the picker is connected to the library controller using a different bus and protocol, resulting in increased system complexity. Finally, no provisions are made for coupling additional library controllers or pickers to the bus scheme.

SUMMARY OF THE INVENTION

In view of the foregoing, it is the principal object of this invention to improve automated storage libraries through the use of a redundant SCSI bus system.

Another object of this invention is an automated storage library having a redundant SCSI bus system which minimizes the need for additional SCSI bus adapters.

Yet another object of this invention is an automated storage library having a redundant SCSI bus system which minimizes the need for customized subcomponents.

Yet another object of this invention is an automated storage library having a redundant SCSI bus system which couples the picker to the SCSI bus.

These and other objects of the invention are accomplished by an optical disk library having a redundant SCSI bus system which utilizes double-sided, multi-ported switches for connecting each of two library controllers to all library pickers and some or all of the optical disk drives in the library. The use of additional library controllers and pickers allows for greater subsystem flexibility and redundancy. The double-sided, multi-ported switches minimize the need for additional SCSI adapters to the library controllers and include anti-latch circuitry between sets of transceivers to eliminate the need to customize the SCSI adapters. The switches are continuously active, yet do not latch, and allow the bus system to meet the constraints of the SCSI standard—including bidirectional capability, maximum number of supported devices, and limited cable length. In addition, the switches are physically located apart from the SCSI adapters, pickers, and optical disk drives, thereby improving field replaceable unit maintainability, and permit switching from the primary library controller to the secondary library controller to provide access to any optical disk in the library when a failure in the system has otherwise made such optical disk inaccessible through the primary library controller. The pickers and optical disk drives are coupled to the switches in one or more single-ended strings to simplify library operations and minimize the amount of the library made inoperative by a device failure. Each picker is coupled to the switches on a single-ended string to which no optical disk drive is attached, further reducing the likelihood that access to optical disks in the library will be lost during a failure.

The foregoing and other objects, features, and advantages of the invention will be apparent from the following more particular description of the preferred embodiments of the invention, as illustrated in the accompanying drawing.

BRIEF DESCRIPTION OF THE DRAWING

FIG. 1 is a front, perspective cut-away view of an optical disk library of the present invention.

FIG. 2 is the same view as in FIG. 1 except that the console panel has been swung aside and the fan has been removed.

DESCRIPTION OF THE PREFERRED EMBODIMENT

Figure 4:
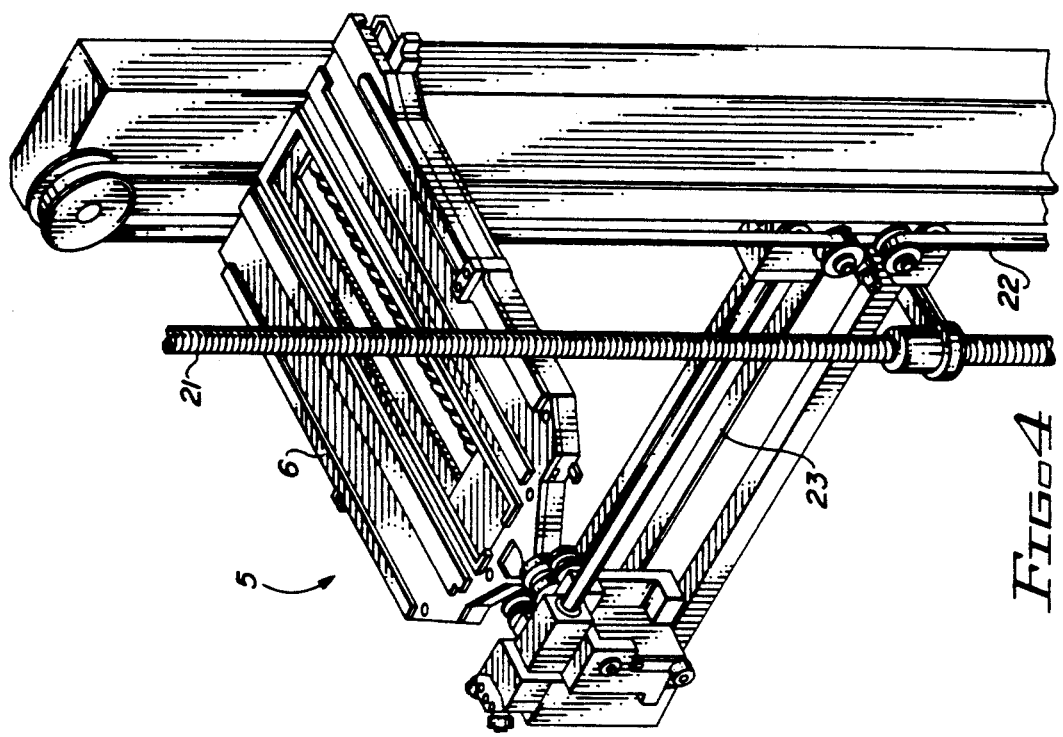
FIG. 4 is a magnified view of the robotic picker and gripper of FIG. 3.
Figure 3:
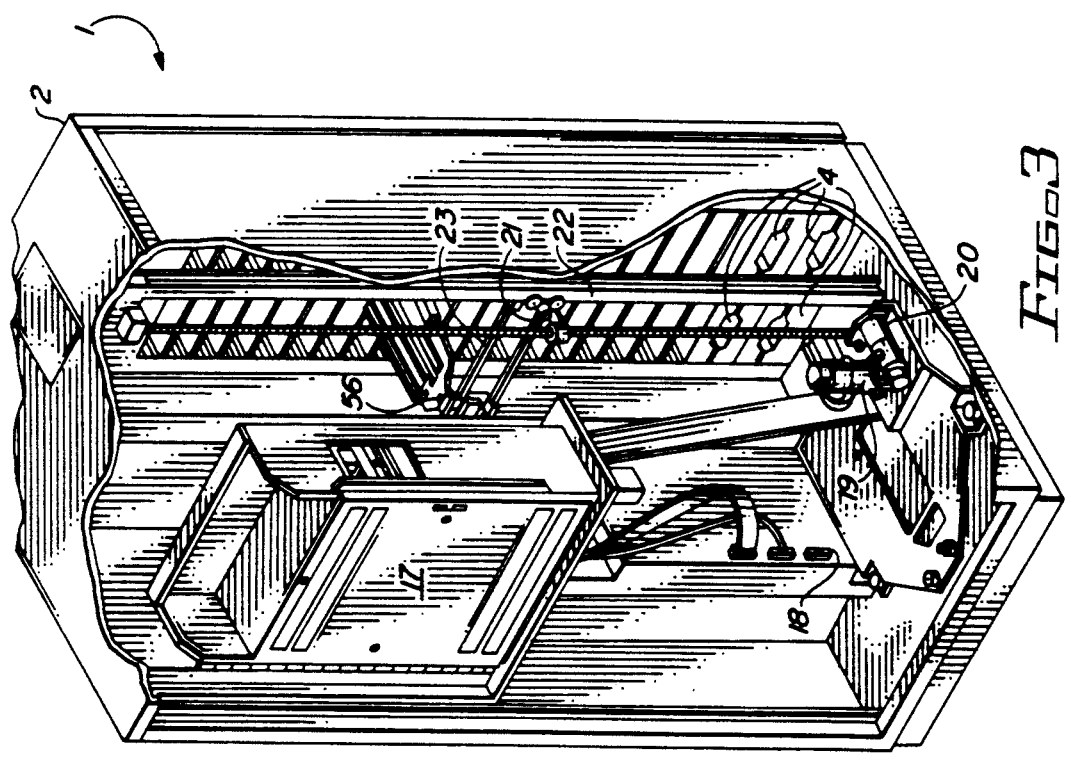
FIG. 3 is a rear, perspective cut-away view of the optical disk library of FIGS. 1 and 2.

Referring now more particularly to the drawing, like numerals denote like features and structural elements in the various figures. The automated storage library of the invention will be described as embodied in an optical disk library. Referring to FIGS. 1-4, various views of such an optical disk library are shown. The library 1 includes a housing 2 enclosing most of the working parts of the library and having front and rear door panels (not shown) for interior access. Library 1 further includes a plurality of optical disk storage cells 3 and a plurality of internal optical disk drives 4. Each storage cell 3 is capable of storing one optical disk having data recorded on one or both sides thereof. The data stored on each side of a disk is referred to as a "volume". In the preferred embodiment, library 1 includes 144 storage cells 3 arranged in two 72 storage cell columns and up to four optical disk drives 4. The optical disks may include ablative, phase-change, magneto-optic, or any other optical recording layers and may be read-only, write-once, or rewritable, as is known, so long as they are compatible with optical disk drives 4. In addition, the optical disks may be recorded in a spiral or concentric track pattern. The precise recording format is not part of the subject invention and may be any known in the art. A robotic picker 5 includes a single gripper 6 capable of accessing an optical disk in any of storage cells 3 or drives 4 and transferring such optical disks therebetween. In the preferred embodiment, the optical disks are configured in cartridges for easy handling by gripper 6 and are 5 and ¼ inch form factor disks, but in alternative embodiments could be any size compatible with drives 4 and gripper 6.

Although the front face of housing 2 is not shown in FIG. 1, certain portions of library 1 protrude through such front face of housing 2 for operator access. These portions are part of a console door 7 and include all or part of a power indicator/switch 8, an entry/exit slot 9, an external optical disk drive 10, a console 11, and a keyboard 12. Console door 7 can be swung aside to allow access therebehind, when necessary, as shown in FIG. 2. Slot 9 is used for inserting optical disks to or removing optical disks from library 1. Commands may be provided by an operator to library 1, via keyboard 12, to have picker 5 receive an optical disk inserted at slot 9 and transport such disk to a storage cell 3 or drive 4, or to have picker 5 retrieve an optical disk from a storage cell 3 or drive 4 and deliver such disk to slot 9 for removal from library 1. Console 11 allows an operator to monitor and control certain operations of library 1 without seeing inside housing 2. External optical disk drive 10, unlike drives 4, cannot be accessed by gripper 6. Drive 10 must instead be loaded and unloaded manually. Library 1 also includes an optical disk drive exhaust fan 14, an external disk drive exhaust fan 15, and power supplies 16.

Once library 1 is powered on, commands received at keyboard 12 are forwarded to a system or library controller 17. In the preferred embodiment, library controller 17 is an IBM PS/2 Model 80 personal computer using the OS/2 operating system. The IBM PS/2 model 80 personal computer includes main memory and one or more storage media, such as those in fixed or floppy disk drives. Library controller 17 issues instructions to drives 4, external drive 10, and picker 5 as will be described. Drive controller cards 13 and picker 5 controller card 18 convert known small computer system interface (SCSI) command packets issued by library controller 17 into the electromechanical action of drives 4, external drive 10, and picker 5. A double-sided, multi-ported switch 60 is included in library 1 and will be further described later herein. The movement of picker 5 within library 1 is X-Y in nature. Movement in the vertical direction is driven by a vertical direction motor 19 and movement in the horizontal direction is driven by a horizontal direction motor 20. Motor 19 turns a lead screw 21 to move picker 5 vertically. Motor 20 turns belts 22 and 23 to move picker 5 horizontally. In addition, picker 5 may be rotated to bring either side of an optical disk within the grasp of gripper 6 to an upright position. The remaining physical features of library 1 are not shown in the drawing, or are shown but not labeled for the purpose of simplification, but are well known.

Figure 5:
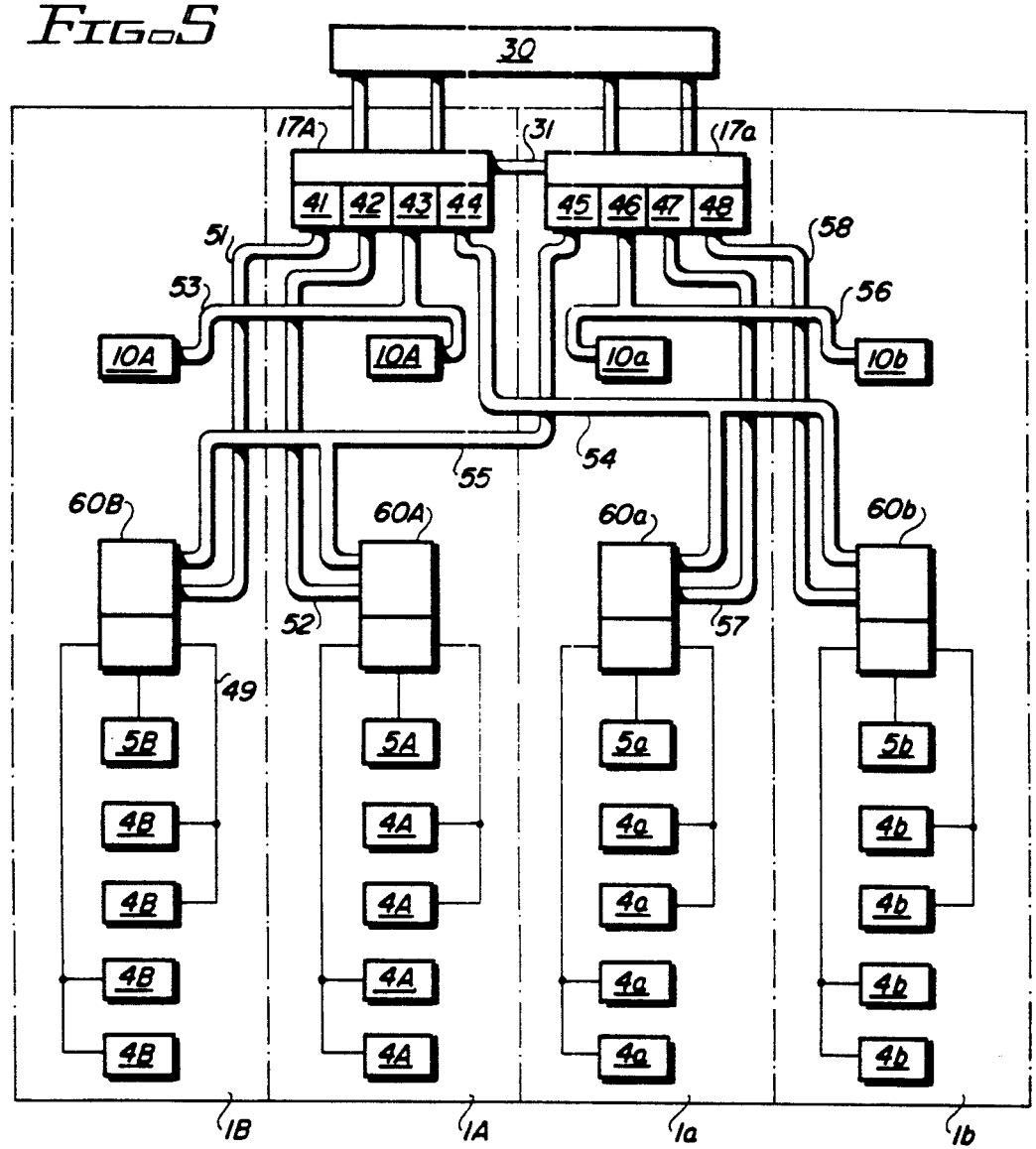
FIG. 5 is a schematic diagram of the optical disk library hardware of FIGS. 1-4.

The library shown in FIGS. 1–4 is a simple single box (a self-contained, free standing unit) library configuration. Although a SCSI bus is used, no redundancy is provided as the system is relatively small. Various other library configurations are known. In the preferred embodiment, four such boxes are interconnected with some modification (as will be described) to create a library of greater storage capacity and flexibility. Referring to FIG. 5, such four box configuration library will now be described. The four boxes are schematically divided by dotted lines and are identified by numerals 1A, 1B, 1a, and 1b. Boxes 1A and 1a each include a library controller, identified as 17A and 17a respectively. Boxes 1B and 1b include no library controller, instead being coupled to library controllers 17A and 17a. The design and operation of library controller 17 is not generally part of the present invention, except as further described herein. Further description of library controller 17 can be found in commonly assigned U.S. Pat. No. 5,239,650, hereby incorporated by reference. One important feature of the library controllers is the use of the IBM PS/2 Model 80 personal computer, as previously mentioned, because it is a commonly available component. The PS/2 Model 80 personal computer includes eight expansion slots to the motherboard therein. Four of such expansion slots are used by console 11, expanded memory and standard subcomponents of the personal computer. The remaining four expansion slots are available for coupling to the components of the library.

Library controllers 17A and 17a are attached to one or more system processors 30 to receive input therefrom and to transmit output thereto. In the preferred embodiment, system processor 30 is an IBM 3090 mainframe processor using the MVS or VM operating system, the connections to which are well known. Other system processors and operating systems could also be used. Library controllers 17A and 17a are connected to each other by the well known RS-232 interface 31 and are each capable of accessing any optical disk stored in any box in the library. Normally, one library controller (sometimes referred to as the "primary" library controller) directs the operation of two boxes and the other library controller directs the operation of the other two boxes. As shown in the drawing, library controller 17A is the primary library controller for boxes 1A and 1B and library controller 17a is the primary library controller for boxes 1a and 1b. However, during a failure condition which prevents the primary library controller from accessing a particular optical disk as desired, such library controller can signal the other (secondary) library controller using the RS-232 interface 31. The primary library controller then ceases operation and the secondary library controller attempts access of the desired optical disk.

Library controllers 17A and 17a each include four SCSI adapter cards, one in each of the available expansion slots therein. The SCSI adapters are identified in the drawing as 41–48 and are commonly available. Each adapter card is coupled by one of SCSI buses 51–58 to other components of the library as shown including sixteen internal optical disk drives 4A, 4B, 4a and 4b, four robotic pickers 5A, 5B, 5a and 5b, four external optical disk drives 10A, 10B, 10a and 10b, and four bidirectional, double-sided, multi-ported switches 60A, 60B, 60a and 60b.

For purposes of this invention, the essentials of a SCSI bus are the use of logical addressing for all data, the bidirectional passage of information, the constraint of supporting no more than eight SCSI devices using a limited cable length (6 meters for the single-ended version), the constraint that all such SCSI devices include provisions for signal termination, and the use of fifty lines, eighteen signals and eight phases of bus activity. Of the eight SCSI devices that can be attached to the bus, only one pair of such devices can communicate at any particular time. The sending/originating device is referred to as the initiator and the receiving/responding (by performing a requested operation) device is referred to as the target. The bus protocol provides for the connection of multiple initiators and targets. Most SCSI devices have a fixed role as an initiator or a target, but some devices are able to assume either role. In the preferred embodiment, any of SCSI adapter cards 41-48, internal optical disk drives 4A, 4B, 4a and 4b, pickers 5A, 5B, 5a and 5b, and external optical disk drives 10A, 10B, 10a and 10b may be an initiator or a target. SCSI signal termination is required to set the impedance of lines to prevent the reflection of signals after a time delay. Without such termination, the predictability of voltage levels on the lines is lost. SCSI terminators will be described further with reference to FIG. 7. Of the eighteen signals, nine are control signals and nine are data signals (eight for actual data and one for parity). The control signals are used to determine when and in what direction data is transferred. These signals include attention (ATN—used by an initiator to inform a target that it has a message), busy (BSY—used by an initiator or target to declare the bus busy), acknowledge (ACK—used by the initiator to acknowledge a request from a target), reset (RST—used by an initiator or target to reset the bus ), message (MSG—used by a target to inform an initiator that a message is being transferred), select (SEL—used by an initiator to select a target and by a target to reselect an initiator), control/data (C/D—used by a target to indicate whether information is control information or data), request (REQ—used by the target to request a data transfer), and input/output (I/O—used by the target to define the direction of movement on the bus). The data signals include command, status, and message information as well as user data.

The bus phases determine what type of information is on the data lines and the direction of information movement. The bus can never be in more than one phase at any given time. The eight bus phases are determined by the control signals and include bus free, arbitration, selection, reselection, command, data, status, and message. The bus free phase indicates that no SCSI device is currently using the SCSI bus (i.e. the bus is available for use). The arbitration phase is optional and allows one SCSI device to gain control of the SCSI bus. The selection phase allows an initiator to choose a target. The reselection phase is optional and allows a target to reconnect to an initiator to complete a suspended operation. The command, data, status, and message phases are used to transfer the respective type of information on the SCSI bus. The command phase allows the target to request command information from the initiator. The data phase allows the target to request that data be sent on the SCSI bus. The status phase allows the target to request to send status information to an initiator. The message phase allows the target to request that a message be sent on the SCSI bus.

A further description of the SCSI bus protocol, signals, phases, and other aspects of operation can be found in American National Standards Institute (ANSI) Small Computer Systems Interface (SCSI) specification X3.131-1986, available from ANSI, 1430 Broadway, New York, New York 10018, and SCSI, "Understanding the Small Computer System Interface", Copyright 1990 by NCR Corporation, and available from Prentice-Hall Inc., Inglewood Cliffs, New Jersey 07632, both of which are hereby incorporated by reference. Except, as provided herein, the SCSI bus system of the present invention operates according to the single-ended driver/receiver SCSI standard using either asynchronous or synchronous protocol.

Still referring to FIG. 5, where a particular SCSI bus 51-58 is coupled to more than one component, the components are daisy-chained so as to allow the passage of information directly to or from any of such components. Switches 60A, 60B, 60a and 60b are capable of directing information exchange between any path coupled to one side of the switch and any path coupled to the other side of the switch. For convenience, the switch sides are not identified by numerals in the drawing, but are separated by a solid horizontal line in FIG. 5. The switches are double-sided and multi-ported in that both sides thereof include at least two ports for connecting separate paths of SCSI bus 50. In the preferred embodiment the switches are not physically included in the circuitry of SCSI adapters 41-48, internal optical disk drives 4A, 4B, 4a and 4b, or pickers 5A, 5B, 5a and 5b—but are located out on the SCSI buses, thereby eliminating the need for customized SCSI adapters or device controllers. The switches, although customized in themselves, are thus single field replaceable units. The switches will be described further herein with reference to FIGS. 6-7.

The internal optical disk drives, pickers, and external optical disk drives are connected in such manner as to enhance both the availability of data in the library and the expandability of the library. The availability of data depends on the points of failure in the library, such as at the drive or picker level, the switch level, the SCSI adapter level, the library controller level, or above. Any single point of failure could potentially disable a SCSI bus 51-58 and eliminate the operation of certain components coupled at that level or below. For example, the failure of an internal optical disk drive eliminates access to it and potentially to all other optical disk drives attached to the same device string. A two device, single-ended (i.e. only one end is attached to a SCSI adapter) device string 49 is identified in the drawing as an example and is actually part of SCSI bus 51 or SCSI bus 55 depending upon the position of switch 60B.

Internal optical disk drives 4A, 4B, 4a and 4b are arranged on two single-ended strings coupled to the switches in each box to prevent the failure of any single internal optical disk drive therein from eliminating access to all such internal optical disk drives in a box (as if, for example, all four internal optical disk drives in a box were arranged on one single-ended string of devices). For a greater measure of safety, the internal optical disk drives could be individually arranged on separate single device single-ended strings. Similarly, pickers 5A, 5B, 5a and 5b are arranged on single-ended device strings apart from any optical disk drives. The picker is a critical component of the library as optical disks in a box cannot be accessed without operation of the picker unless they by chance are already mounted in an optical disk drive. If a picker is arranged in a device string with an optical disk drive, the failure of such optical disk drive could disable the bus 50 and eliminate operation of the picker. As long as library controller 17A or 17a has at least one internal optical disk drive and a picker in the same box available, access to any optical disk in a box is possible, although at potentially reduced performance.

Further redundancy is achieved by attaching each box to a separate SCSI adapter 41-48 of library controllers 17A and 17a. For example, box 1A is coupled to SCSI adapter 42 by SCSI bus 52 and box 1B is coupled to SCSI adapter 41 by SCSI bus 51. This prevents access to either box from being lost by a failure in the other box. Only a failure in library controller 17A (or above) would eliminate the access to both boxes by library controller 17A. Furthermore, because SCSI adapter 45 and SCSI bus 55 couple library controller 17a to boxes 1A and 1B, and because switches 60A and 60B prevent failures in library controller 17A from effecting the operation of the SCSI devices coupled to the other sides of switches 60A and 60B (as will be described), the optical disks therein could still be accessed by switching library operations from library controller 17A to library controller 17a, as previously described. Note that SCSI buses 51, 52, 57, and 58 are each coupled to six SCSI devices, including SCSI adapters 41, 42, 47, and 48 respectively. This permits the addition of one or two SCSI devices, such as internal optical disk drives, to a box if desired. SCSI buses 54 and 55 are potentially coupled to eleven SCSI devices, including SCSI adapters 44 and 45, respectively. Because a SCSI bus is limited to supporting eight SCSI devices, each library controller is programmed to address less than all of the internal optical disk drives coupled to SCSI bus 54 and 55. For example, SCSI adapter 44 only addresses one single-ended string of internal optical disk drives 4a in box 1a and one single-ended string of internal optical disk drives 4b in box 4b (and also pickers 5a and 5b, respectively, for a total of seven SCSI devices on SCSI bus 54 including SCSI adapter 44 itself). This is accomplished by well known microcode-controlled addressing and switch position selection techniques. The two remaining SCSI adapters 43 and 46 are coupled via buses 53 and 56 to external optical disk drives 10A and 10B, and external optical disk drives 10a and 10b respectively. Such coupling isolates the external optical disk drives from the pickers, internal optical disk drives, and switches of each box to maintain a certain minimum level of data availability. Even when access to all optical disks inside of a box is lost, optical disks outside of the library may still be accessed by their manual insertion into the external optical disk drive. In an alternative embodiment, the external optical disk drives could instead be coupled to the same SCSI bus as their respective internal optical disk drives, allowing for a different one of the SCSI adapters in each library controller to be coupled to a different box. Although such a configuration would increase the number of SCSI devices for which redundancy exists, it would also make the external optical disk drives susceptible to the failures of SCSI devices in the same device string. Because each box includes six SCSI devices, not including the SCSI adapters, it is impossible to couple and support all of the SCSI devices in two such boxes to/on a single SCSI bus. In the preferred embodiment, the number of external optical disk drives coupled to SCSI buses 53 and 56 could be expanded as desired so long as the number of SCSI devices supported by a single SCSI bus does not exceed eight.

Figure 6:
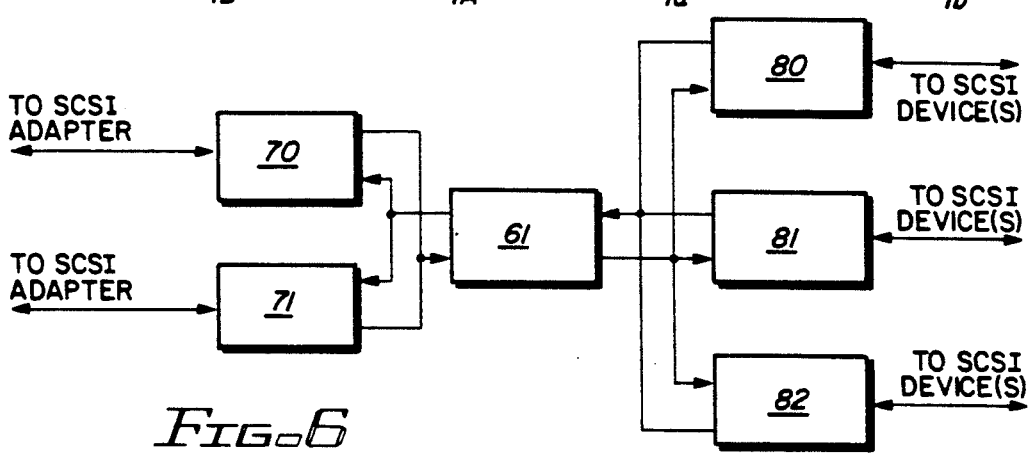
FIG. 6 is a schematic diagram of one signal of the bidirectional, double-sided, multi-ported switches of FIG. 5.

Referring to FIG. 6, a portion of a switch representative of any shown in FIG. 5 will now be described. For simplicity, the drawing shows the connections for but a single one of the 18 signals in the SCSI bus—the actual switch includes a set of 18 such connections. The switch includes transceivers 70 and 71 on one side and transceivers 80-82 on the other side. The transceivers serve to receive and transmit signals across the switch. Transceivers 70 and 71 are each coupled by a SCSI bus to one of the library controllers and transceivers 80-82 are each coupled to one single-ended device string. Anti-latch and control logic circuits 61 provide two functions. First, the anti-latch circuits prevent latch conditions that would otherwise occur because of positive feedback in the transceiver circuits. Also, the control logic circuits allow either of transceivers 70 and 71 to be coupled to any one or more of transceivers 80-82 at any given time. The transceivers selected at any particular time are continuously active. In alternative embodiments, the number of transceivers on either side of the switches could be modified to accommodate different SCSI bus and SCSI device configurations.

Figure 7:
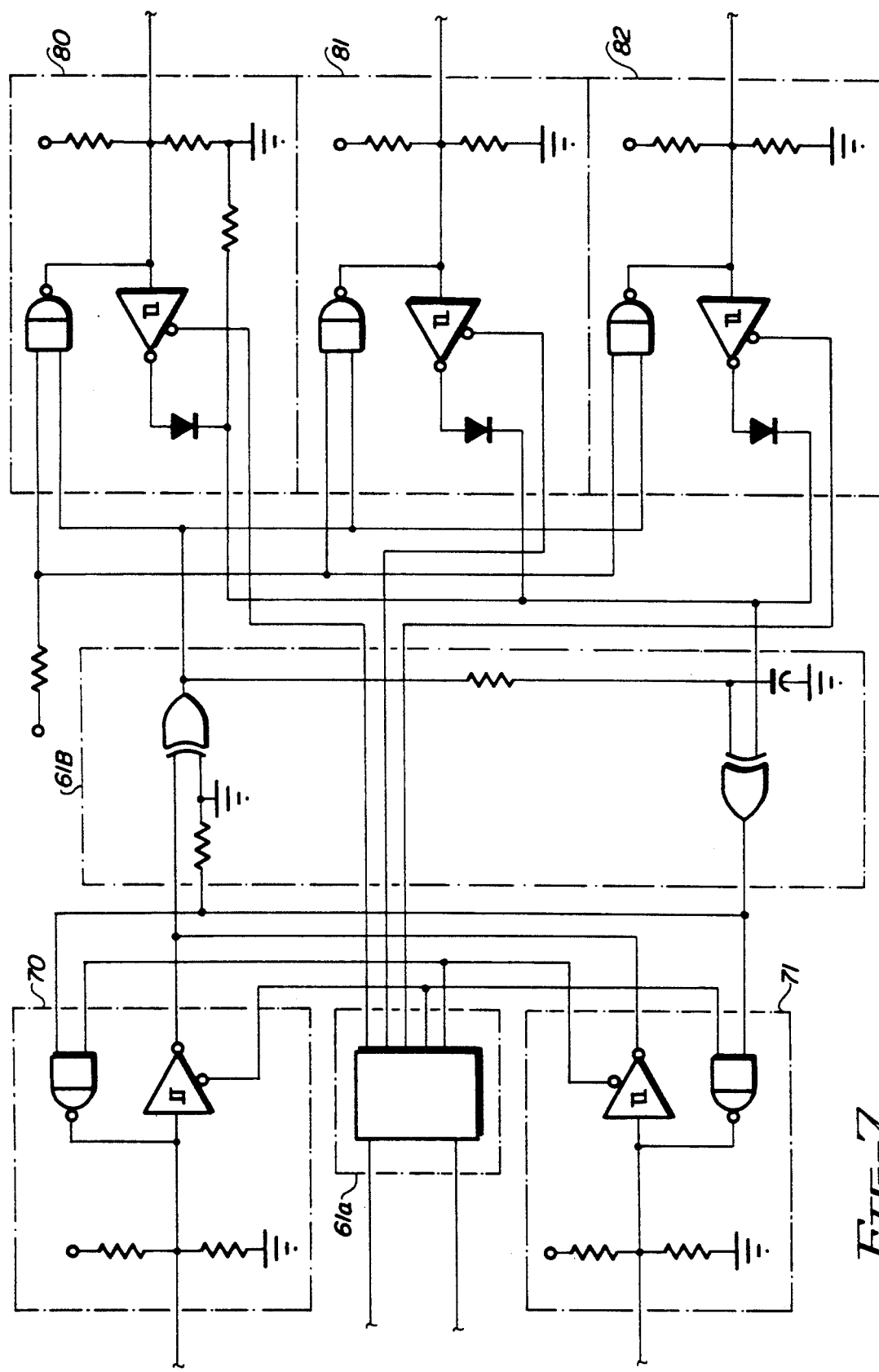
FIG. 7 is a circuit diagram of the signal of the bidirectional, double-sided, multi-ported switch of FIG. 6.

Referring to FIG. 7, a portion of the switch of FIG. 6 will now be described in further detail. The dotted lines of FIG. 7 correspond to the subcomponents of FIG. 6. As shown, the switch uses standard TTL design logic. Each transceiver includes a bidirectional inverter driver/receiver. An AND gate serves as the driver/transmitter and a Schmitt trigger/inverter serves as the receiver for each transceiver. Transceivers 80-82 also include one diode each to isolate the receivers from each other. Each transceiver is terminated according to SCSI specifications using a 220 ohm and a 330 ohm resistor arranged as a voltage divider. The control logic circuits 61a are common to all SCSI signals in the library, coupling the library controller parallel part (not the SCSI adapters) to the switches to allow for control of the position of the switches. Select lines are coupled to library controllers 17A and 17a respectively to manipulate control logic circuits 61a. The anti-latch circuits 61b includes two 100 ohm resistors, two 150 picofarad capacitors, and two exclusive OR gates. The anti-latch circuits prevent positive feedback among the transceivers. For example, consider the situation where control logic circuits 61a are set to allow communication between transceivers 70 and 82, and a signal is to be transferred from transceiver 70 to transceiver 82. When an active low signal is present at the receiver of transceiver 70 it is inverted and sent to the upper XOR gate (as shown) in anti-latch circuits 61b. Remaining inverted, the signal is sent to the driver of transceiver 82 and is also delayed by an RC network and sent to the lower XOR gate of anti-latch circuits 61b. The driver of the transceiver 82 inverts the signal back to a low state, which is then inverted high by the receiver of transceiver 82 and sent to the other input of the lower XOR gate of anti-latch circuits 61b. If not for the existence of anti-latch circuits 61b, this high signal would be sent back to the driver of transceiver 70, which would then hold the input to the receiver of transceiver 70 low even after the low signal from the SCSI bus is removed. This latching action is prevented by applying the delayed signal from the upper XOR gate to the lower XOR gate of anti-latch circuits 61b, when the low signal from the SCSI bus is removed from the receiver of transceiver 70, the driver of transceiver 82 no longer drives the SCSI bus line or the receiver of transceiver 82 low.

While the invention has been particularly shown and described with reference to preferred embodiments thereof, it will be understood by those skilled in the art that various changes in detail may be made therein without departing from the spirit, scope and teaching of the invention. For example, the preferred embodiment of the invention is described as an optical disk library, but could actually be any automated storage library. Also, the number of library boxes and library controllers could be expanded to create still larger automated storage libraries, nevertheless made redundant according to the teaching herein. Accordingly, the invention disclosed herein is to be limited only as specified in the following claims.

What is claimed is:

1. An automated storage library including a redundant SCSI bus system, the automated storage library comprising:
    a first library controller;
    a second library controller;
    a plurality of storage cells, each storage cell capable of storing a data storage medium therein;
    a peripheral storage device;
    a picker capable of transferring a data storage medium between one of the storage cells and the peripheral storage device;
    a switch having a first and second side, a first transceiver on the first side of the switch and coupled to the first controller, a second transceiver on the first side of the switch and coupled to the second controller, a third transceiver on the second side of the switch and coupled to the peripheral storage device, anti-latch circuits coupled between the first, second, and third transceivers, and switch control logic coupled to the transceivers for selectively coupling a transceiver on the first side of the switch to the third transceiver, the picker and peripheral storage device coupled to the second side of the switch by at least one SCSI bus;
    a first SCSI bus coupling the first controller to a first port on the first side of the switch;
    a second SCSI bus coupling the second controller to a second port on the first side of the switch;
    the switch always available to change which of the first and second ports is coupled to the second side.

2. The automated storage library of claim 1 wherein the switch is physically separated from the circuit cards supporting the controllers, picker, and peripheral storage device.

3. The automated storage library of claim 1 further comprising a plurality of peripheral storage devices each coupled to the second side of the switch using only single-ended device strings.

4. The storage library of claim 1 wherein the switch is physically separated from the circuit cards supporting the controllers and peripheral storage device.

5. The storage library of claim 1 further comprising a plurality of peripheral storage devices each coupled to the second side of the switch using only single-ended device strings.

6. An automated storage library including a redundant SCSI bus system, the automated storage library comprising:
    a first library controller;
    a first plurality of storage cells, each storage cell capable of storing a single data storage medium;
    a first plurality of peripheral storage devices;
    a picker capable of transferring a data storage medium between one of the first plurality of storage cells and one of the first plurality of peripheral storage devices;
    a first switch having a first and second side, the first picker and the first plurality of peripheral storage devices coupled to a second side of the first switch;
    a second library controller;
    a second plurality of storage cells, each storage cell capable of storing a single data storage medium;
    a second plurality of peripheral storage devices;
    a second picker capable of transferring a data storage medium between one of the second plurality of storage cells and one of the second plurality of peripheral storage devices;
    a second switch having a first and a second side, the second picker and the second plurality of peripheral storage devices coupled to a second side of the second switch;
    a first SCSI bus coupling the first controller to a first port on the first side of the first switch;
    a second SCSI bus coupling the second controller to a second port on the first side of the first switch;
    a third SCSI bus coupling the first controller to a first port on the first side of the second switch; and
    a fourth SCSI bus coupling the second controller to a second port on the first side of the second switch;
    the first and second switches each including
        a first transceiver on the first side thereof coupled to the first controller;
        a second transceiver on the first side thereof coupled to the second controller;
        a set of transceivers on the second side thereof coupled to a picker and a plurality of peripheral storage devices;
        anti-latch circuits coupled between the first transceiver, second transceiver, and the set of transceivers; and
        switch control logic coupled to the transceivers for selectively coupling a transceiver on the first side of the switch to a transceiver on the second side of the switch.

7. The automated storage library of claim 5 wherein each switch is physically separated from the circuit cards supporting the controllers, pickers, and peripheral storage devices.

8. The automated storage library of claim 5 wherein the pickers and peripheral storage devices are coupled to the second side of the switches using only single-ended device strings.

9. The automated storage library of claim 5 wherein the first picker is coupled to a transceiver on the second side of the first switch and no peripheral storage device is coupled to said transceiver on the second side of the first switch, and the second picker is coupled to a transceiver on the second side of the second switch and no peripheral storage device is coupled to said transceiver on the second side of the second switch.

10. An automated storage library including a redundant SCSI bus system, the automated storage library comprising:
    a first library controller;
    first and second pluralities of storage cells, each storage cell capable of storing a single data storage medium;
    first and second pluralities of peripheral storage devices;
    first and second pickers, the first picker capable of transferring a data storage medium between one of the first plurality of storage cells and one of the first plurality of peripheral storage devices and the second picker capable of transferring a data storage medium between one of the second plurality of storage cells and one of the second plurality of peripheral storage devices;
    first and second switches each having a first and a second side, the first picker and the first plurality of peripheral storage devices coupled to the second side of the first switch, the second picker and the second plurality of peripheral storage devices coupled to the second side of the second switch;

a second library controller;

a third and fourth pluralities of storage cells, each storage cell capable of storing a single data storage medium;

third and fourth pluralities of peripheral storage devices;

third and fourth pickers, the third picker capable of transferring a data storage medium between one of the third plurality of storage cells and one of the third plurality of peripheral storage devices and the fourth picker capable of transferring a data storage medium between one of the fourth plurality of storage cells and one of the fourth plurality of peripheral storage devices;

third and fourth switches each having a first and a second side, the third picker and the third plurality of peripheral storage devices coupled to the second side of the third switch, the fourth picker and the fourth plurality of peripheral storage devices coupled to the second side of the fourth switch;

a first SCSI bus coupling the first controller to a first port on the first side of the first switch;

a second SCSI bus coupling the first controller to a first port on the first side of the second switch;

a third SCSI bus coupling the first controller to a first port on the first side of the third switch and to a first port on the first side of the fourth switch;

fourth SCSI bus coupling the second controller to a second port on the first side of the first switch and to a second port on the first side of the second switch;

a fifth SCSI bus coupling the second controller to a second port on the first side of the third switch;

a sixth SCSI bus coupling the second controller to a second port on the first side of the fourth switch; and means coupled to the first controller for preventing the first controller from addressing some of the third and fourth pluralities of peripheral storage devices and for preventing the second controller from addressing some of the first and second pluralities of peripheral storage devices.

11. The automated storage library of claim 10 wherein each switch further comprises:

a first transceiver on the first side thereof coupled to the first controller;

a second transceiver on the first side thereof coupled to the second controller;

a set of transceivers on the second side thereof coupled to a picker and a plurality of peripheral storage devices;

anti-latch circuits coupled between the first transceiver, second transceiver, and the set of transceivers; and switch control logic coupled to the transceivers for selectively coupling a transceiver on the first side of the switch to a transceiver on the second side of the switch.

12. The automated storage library of claim 10 wherein each switch is physically separated from the circuit cards supporting the controllers, pickers, and peripheral storage devices.

13. The automated storage library of claim 10 wherein the pickers and peripheral storage devices are coupled to the second side of the switches using only single-ended device strings.

14. The automated storage library of claim 10 wherein the coupling of a picker to a transceiver on the second side of a switch includes no peripheral storage device coupled to said transceiver.

15. A storage library including a redundant SCSI bus system, the storage library comprising:

a first library controller;

a second library controller;

a peripheral storage device;

a switch including a first transceiver and a second transceiver on a first side thereof, a third transceiver on the second side thereof and coupled to the peripheral storage device by a SCSI bus, anti-latch circuits coupled between the first and second transceiver on the first side thereof and the third transceiver on the second side thereof, and switch control logic coupled to the transceivers and always available to change which transceiver on the first side thereof is coupled to the third transceiver;

a first SCSI bus coupling the first controller to the first transceiver; and a second SCSI bus coupling the second controller to the second transceiver.

* * * * *

UNITED STATES PATENT AND TRADEMARK OFFICE
CERTIFICATE OF CORRECTION

PATENT NO. : 5,289,589
DATED : February 22, 1994
INVENTOR(S) : R. L. Bingham, et al.

It is certified that error appears in the above-identified patent and that said Letters Patent is hereby corrected as shown below:

Column 12, line 33:
Claim 7,  Change "5" to --6--.

Column 12, line 37:
Claim 8,  Change "5" to --6--.

Column 12, line 41:
Claim 9,  Change "5" to --6--.

Signed and Sealed this

Thirtieth Day of July, 1996

Attest:

BRUCE LEHMAN

Attesting Officer  Commissioner of Patents and Trademarks